United States Patent
Gardelegen et al.

(10) Patent No.: US 8,589,721 B2
(45) Date of Patent: Nov. 19, 2013

(54) BALANCING POWER CONSUMPTION AND HIGH AVAILABILITY IN AN INFORMATION TECHNOLOGY SYSTEM

(75) Inventors: Thomas Gardelegen, Wiesbaden (DE); Nils Haustein, Soergentoch (DE); Peter Kimmel, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/170,487

(22) Filed: Jun. 28, 2011

(65) Prior Publication Data

US 2012/0137172 A1  May 31, 2012

(30) Foreign Application Priority Data

Nov. 30, 2010 (EP) .................................. 10193091

(51) Int. Cl.
*G06F 11/00* (2006.01)
(52) U.S. Cl.
USPC ................................. 714/3; 714/14; 713/324

(58) Field of Classification Search
None
See application file for complete search history.

(56) References Cited

U.S. PATENT DOCUMENTS

| 7,043,650 | B2 | 5/2006 | Bresniker et al. |
| 7,472,300 | B1 * | 12/2008 | Haustein et al. ............... 713/323 |
| 8,155,766 | B2 * | 4/2012 | Ichikawa et al. ................. 700/82 |
| 8,332,678 | B1 * | 12/2012 | Mahalingam et al. ......... 713/340 |
| 2008/0162983 | A1 * | 7/2008 | Baba et al. ......................... 714/3 |
| 2010/0174940 | A1 * | 7/2010 | Kitora ................................ 714/7 |
| 2012/0151248 | A1 * | 6/2012 | Bower et al. .................. 714/4.11 |

* cited by examiner

*Primary Examiner* — Gabriel Chu
(74) *Attorney, Agent, or Firm* — Steven Chiu, Esq.; Kevin P. Radigan, Esq.; Heslin Rothenberg Farley & Mesiti P.C.

(57) ABSTRACT

A system and method are disclosed for balancing the requirements of high availability achieved by redundant active components and power saving achieved by less active components. The requirement for high availability can be expressed by the recovery time objective (RTO) which specifies the amount of time it takes to recover from a failure in the system. Based on the configured RTO, the system configures the most appropriate power mode.

11 Claims, 1 Drawing Sheet ously a system controller is powered off (e.g. 118). The estimated power saving is between 10-30%.

BALANCING POWER CONSUMPTION AND HIGH AVAILABILITY IN AN INFORMATION TECHNOLOGY SYSTEM

PRIOR FOREIGN APPLICATION

This application claims priority from European Patent Application No. 10193091.5, filed Nov. 30, 2010, which is hereby incorporated herein by reference in its entirety.

BACKGROUND

The present invention relates generally to availability versus the number of active redundant components in an information technology system or subsystem.

One way of expressing the requirement for high availability in an information technology system or subsystem is through a recovery time objective (RTO), which specifies the amount of time it takes to recover from a failure in the system. The prior art makes use of power consuming, redundant components to improve the recovery time objective of systems and subsystems. Thus the cost of providing high availability in a system or subsystem involves an increase in power consumption.

As an example, one method of providing high availability is illustrated by U.S. Pat. No. 7,043,650 (patent application Ser. No. 10/000,703, filed on Oct. 31, 2001), which discloses a system and method for intelligent control of power consumption of distributed services during periods when power consumption must be reduced. Distributed services are provided by computer systems and the system and methods pertaining to this invention selectively shutdown services.

BRIEF SUMMARY

It is therefore an object of the invention to provide a method and system for balancing power consumption and high availability in a information technology system avoiding the disadvantages as described in the prior art.

This object is achieved by the independent claims. Advantageous embodiments are laid down in the dependent claims.

The invention teaches a system and method for managing power in an information technology system or subsystem while selecting a level of availability determined by a recovery time objective (RTO) for the system or subsystem. A translation of each of a set of values of power to a value of a recovery time objective, corresponding to a number of components that are power enabled, is derived and stored. Then, when a predetermined value of RTO is desired, the system will automatically set a power saving mode based on system activity and schedules to achieve the predetermined recovery time objective. The power saving mode is implemented according to the predetermined recovery time objective by powering off selected redundant components. If, during or subsequent to the powering off selected redundant components, one or more components fail, the system will automatically power on one or more selected redundant components. Based on the configured RTO, the inventive system configures the most appropriate power mode. The user can configure the RTO for certain time ranges. Based on the configured RTO, the system according to an exemplary embodiment of this invention, selectively powers off redundant components of a storage system such as that depicted by 200 in FIG. 1. Thereby the system, according to the exemplary embodiment of the invention depicted in FIG. 2, deploys three power modes. In the first mode of operation all components are active providing the lowest RTO and saving no power. In another mode of operation some power related redundant components are powered off saving some power. This provides a medium RTO. In a third mode of operation more redundant components are powered off saving more power but providing higher RTO. Additional methods are taught for the second and third power mode to prevent outages by automatically activating additional power supplies.

DETAILED DESCRIPTION

Figure 1:
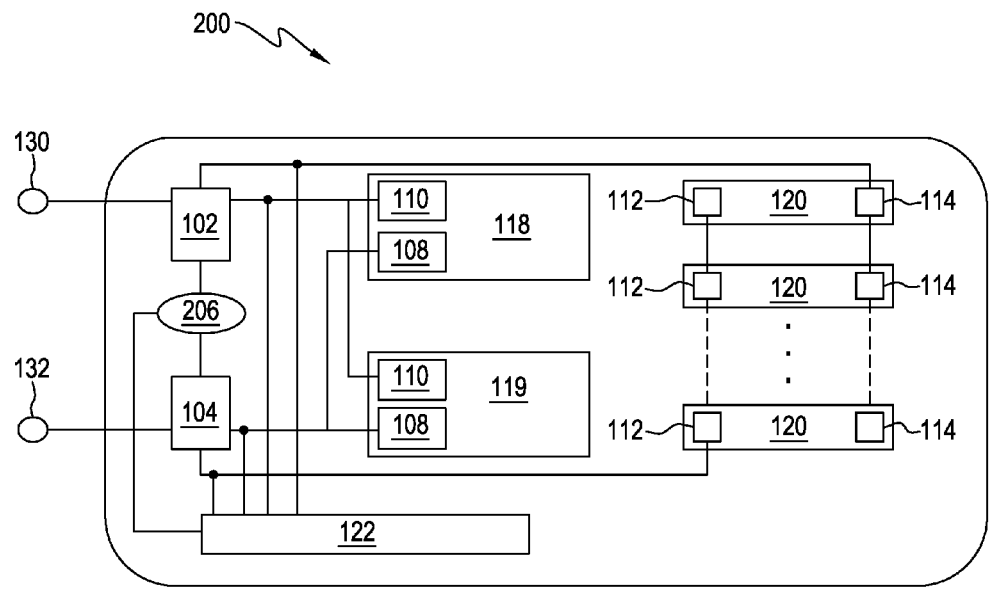
FIG. 1 depicts one embodiment of power design for a storage system with a power control module to configure the power according to the high availability requirements, in accordance with one or more aspects of the present invention.

An exemplary embodiment of a power design is shown in FIG. 1, and comprises a storage system 200 with only two redundant main power supplies 102, 104 providing all required voltages for all components (controller 118, 119 and disk system 120). This design removes power supplies 108, 110, 112 and 114 and makes storage system 200 operate more power efficient because the additional efficiency of the removed power supplies does not play a role anymore. In addition, this exemplary embodiment provides an inventive power control module 206 to storage system 200. Power control module 206 is connected to the main power supplies 102 and 104. This connection allows the power control module to instruct the power supplies 102 and 104 to power off or on.

The power control module 206 allows the user to configure the high availability requirements based on time ranges. The high availability requirements are configured by means of RTO which is usually expressed in seconds.

Based on the configured high availability requirements the power control module defines, for example, three power modes:

1. High availability mode: Provides RTO=0. All components are active.
2. Power Saving Mode 1: Provides 30 sec<RTO<60 sec. All redundant power supplies are powered off (e.g. 104, 108, 112)
3. Power Saving Mode 2: Provides 20 min<RTO<30 min. Same as power mode 2 plus one system controller is powered off (e.g. 118)

The user can configure times where high availability is required. At these times, the high availability mode is set and all components are active. No power is saved.

The user can configure times where high availability is not required and where the system must be recovered after 60 seconds (power saving mode 2) in case of a power failure. In these times power saving mode 1 is configured—power supplies 104, 108 and 112 are powered off—and some power is saved. The estimated power saving is between 5-20%.

The user can configure times where high availability is not required and where the system must be recovered after 30 minutes in case of a power failure (power saving mode 2). In these times power saving mode 2 is configured—power supplies 104, 108 and 112 are powered off and in addition controller 118 is powered off—and additional power is saved. The estimated power savings in this power saving mode is between 20-40%.

Figure 2:
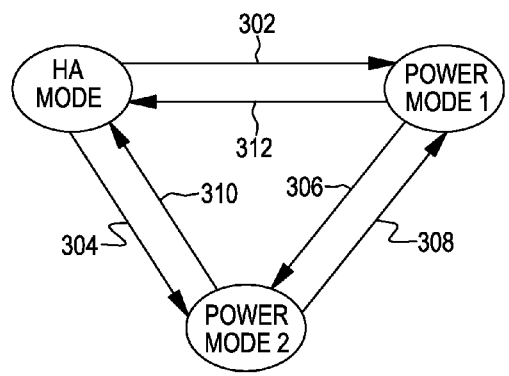
FIG. 2 depicts one embodiment of power mode transitions possible for, for example, the storage system of FIG. 1, in accordance with one or more aspects of the present invention.

Based on the configuration of the power modes in power control module 206, the power control module initiates the necessary changes to disk system 200. These changes may be performed in a concurrent manner. In one embodiment, there are six transitions within the system as shown in FIG. 2. These six transitions are as follows:

302: Transition from high availability mode to power saving mode 1: the control module powers down power supplies 104, 108 and 112 leaving the system 100 running with power supplies 102, 110 and 114 as well as both controllers 118 and 119 and disk enclosure 120.

304: Transition from high availability mode to power saving mode 2: the control module powers down power supplies 104, 108 and 112 as well as controller 118 leaving the system 100 running with power supplies 102, 110 and 114 as well as controller 119 and disk enclosure 120.

306: Transition from power saving mode 1 to power saving mode 2: the control module powers down controller 118.

308: Transition from power saving mode 2 to power saving mode 1: the control module powers on controller 118.

310: Transition from power saving mode 2 to high availability mode: the control module powers on power supplies 104, 108 and 112 as well as controller 118.

312: Transition from power saving mode 1 to high availability mode: the control module powers on power supplies 104, 108 and 112.

In power saving mode 1 and power saving mode 2 there is limited redundancy. If, for example, the power line 130 or power supply 102 fails the storage system 200 may power down completely. Therefore, additional methods may be provided by the power control module 206. These methods detect power failures for power line 130 and power supply 102 and automatically activate other components such as power supply 104. In order to provide uninterrupted operation batteries 122 are used as a buffer to bridge the time from when the active power supply 102 has failed until the second power supply 104 is running Power control module 206 thereby switches the power sourcing to the batteries. During this recovery time the controllers 118 and 119 as well as disk enclosures 120 are sourced by the batteries.

Power saving mode 1 also tolerates the failure of controller power supply 108 of controller 118 because controller 119 is still active and capable of providing service. Power saving mode 2 does not tolerate this.

In one embodiment, the configuration of the recovery time objective is based on times which the user can enter via a user interface. Such user interface is already provided in prior art storage systems.

In an alternate embodiment, the storage system 200, and more precisely the power configuration module 206, observes the usage of the storage system 200 over time. Based on the usage the power control module 206, times with repeated low or non-activity are derived. The power control module compares the system activity against a threshold A1 and A2 where A1>A2. The activity can be measured in IO operations per second or minute. If the activity falls below this threshold A1 and is still above threshold A2, the power control module 206 automatically enters power saving mode 1 (transition 302). If the activity falls below this threshold A2 the power control module 206 automatically enters power saving mode 2 (transition 304 and 306). Likewise, if the system 200 is in power mode 2 and the activity is higher than threshold A2 and lower than threshold A1, then the system enters power saving mode 1 (transition 308). Or, if the activity is above threshold A1, then the system enters high availability mode (transition 310 and 312).

At any time, the user can overrule those policies and can manually switch to another Power/HA mode.

The concepts disclosed herein can also be extended to servers, or other IT components having redundant power components.

In addition, aspects of the present invention can apply to storage subsystems, which are in a mirroring (replication) relationship, or servers with redundant power components which are part of a cluster of several servers.

If the storage subsystem 200 detects any defects, e.g., in the backend, the power saving module 206 can decide to go to HA mode again to allow maximum redundancy during repair. Thus the system switches automatically to the more redundant mode upon failures.

Storage subsystems might additionally be in mirroring (replication) relationships with other storage subsystems, each single system having redundant power components.

This can be for instance a Peer-to-Peer Remote Copy replication, or even cascaded mirroring.

Storage systems with mirror relations can implement different power modes: For example the primary storage system can work in HA Mode (fully redundant), and the secondary (and tertiary, if applicable) can work in power saving mode 1 (redundant power supplies are powered off) or in power saving mode 2.

Storage systems with mirror relations automatically change the power mode based on errors: If the primary system is in HA Mode and has a failure then the secondary system is automatically switched to HA Mode. Or if the primary system is in a power saving mode and the secondary system has a failure then the primary system is automatically switched to HA Mode.

The concepts disclosed herein may be extended to servers, or other IT systems having redundant power components. A server may include redundant power components. The power modes according to the subject invention can be applied for servers as well. These servers—or similar IT components—might be part of a cluster of several nodes, where each node has got redundant power components. Also for this case we can consider bringing some—or all—servers' redundant power components to lower power levels at certain times where the customer would allow this, where each node still delivers its usual service in the cluster but on a lower grade of individual redundancy like Power saving Mode 1, yet where one node or all nodes would enter a higher level of redundancy again e.g. like HA Mode, upon failures in another node member of the cluster.

It should be noted that embodiments may take the form of an entire hardware implementation, an entire software embodiment or an embodiment containing both, hardware and software elements. In a preferred embodiment, the invention may be implemented in software which includes, but is not limited to, firmware, resident software and microcode.

In one embodiment, a data processing program for execution in a data processing system may be provided comprising software code portions for performing the method, as described above, when the program is run on a data processing system. The data processing system may be a computer or computer system attached to the asset management system via communication means.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

What is claimed is:

1. A system for balancing power consumption and high availability in an information technology system or subsystem while selecting a level of availability determined by a recovery time objective (RTO) for the system or subsystem, comprising:
   means for deriving and storing a translation of each of a set of values of power to a value of a recovery time objective corresponding to a number of components that are power enabled;
   means for automatically setting, a power saving mode based on system activity and schedules to achieve a predetermined recovery time objective; and
   means for implementing the power saving mode according to the predetermined recovery time objective by powering off selected redundant components.

2. The system of claim 1, further including
   means for automatically powering on more redundant components upon component failures during and subsequent to the powering off selected redundant components.

3. The system of claim 1, wherein said information technology system is a storage system.

4. The system of claim 3, wherein said storage is in a remote replication relationship with another storage system and which enters in a high availability mode upon failure of its replication storage system.

5. The system of claim 1, wherein said information technology system is a server system.

6. The system of claim 5, wherein said server system is part of server cluster and enters in a high availability mode upon failures of other node in said cluster.

7. A computer program product for balancing power consumption and high availability in an information technology system or subsystem, while selecting a level of availability determined by a recovery time objective (RTO) for the system or subsystem, the computer program product comprising:
   a non-transitory computer-readable storage medium readable by a processor and storing instructions for execution by the processor to perform a method comprising:
   deriving and storing a translation of each of a set of values of power to a value of a recovery time objective corresponding to a number of components that are power enabled;
   automatically setting a power saving mode based on system activity and schedules to achieve predetermined recovery time objective; and
   implementing the power saving mode according to the predetermined recovery time objective by powering off selected redundant components.

8. The computer program product of claim 7, further including:
   automatically powering on more redundant components upon component failures during and subsequent to the powering off selected redundant components.

9. The computer program product of claim 7, wherein said power saving mode is configured by a power control module.

10. The computer program product of claim 9, wherein said power control module defines a high availability mode and at least one power save mode, wherein in said high availability mode all components are active and wherein in said at least power save mode all redundant components are powered off.

11. The computer program product of claim 7, further comprising automatically entering in said high availability upon detection of failure.

* * * * *